May 3, 1966  H. KELCH  3,249,296
TARIFF SETTING ARRANGEMENT FOR TAXIMETERS
Filed Jan. 21, 1963  5 Sheets-Sheet 1

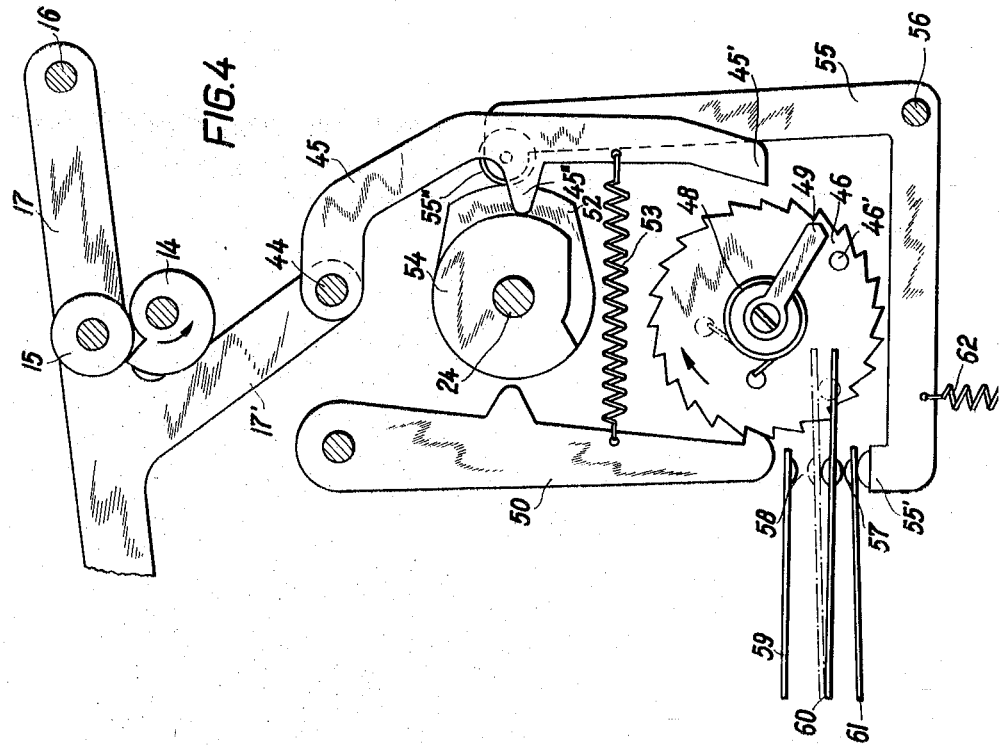
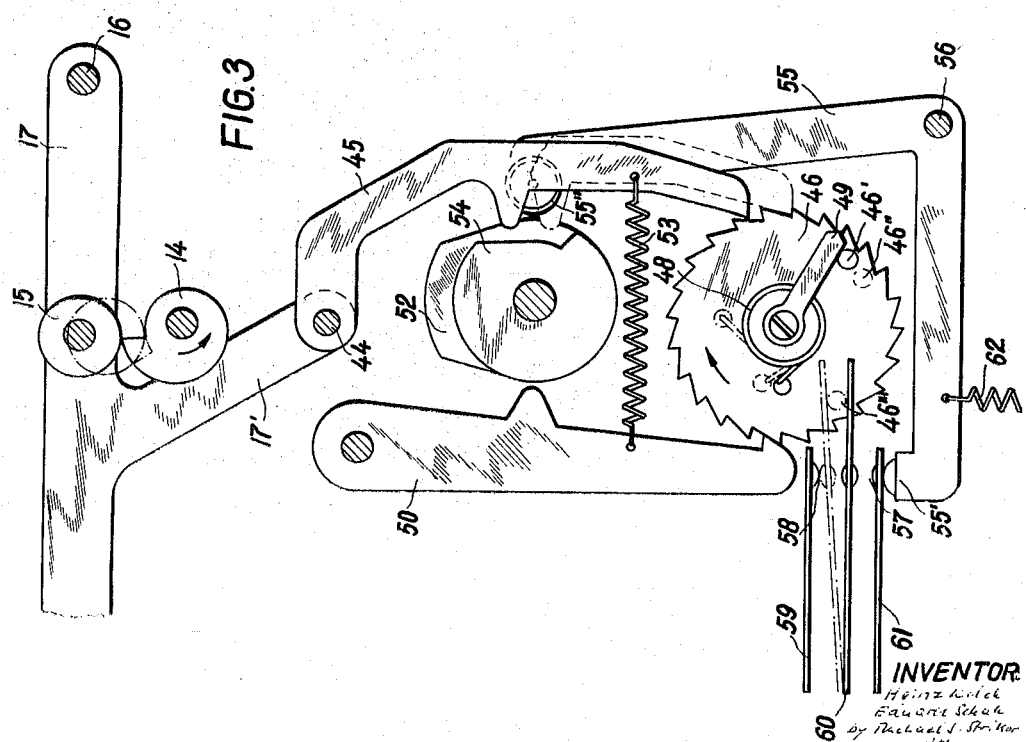
INVENTOR
Heinz Kelch
Eduard Schak
by Michael S. Striker
Attorney

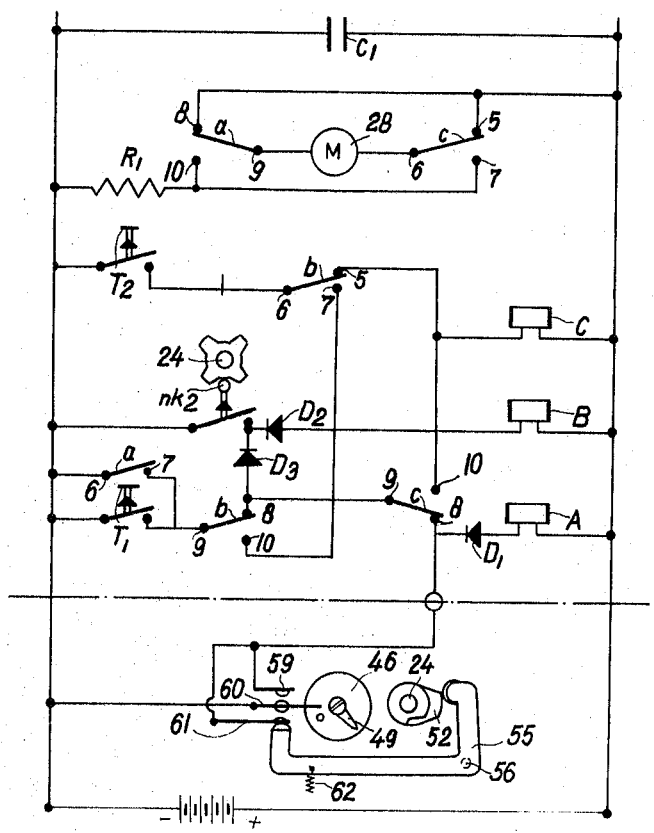

United States Patent Office 3,249,296
Patented May 3, 1966

3,249,296
TARIFF SETTING ARRANGEMENT FOR
TAXIMETERS
Heinz Kelch and Eduard Schuh, Villingen, Black Forest,
Germany, assignors to Kienzle Apparate G.m.b.H.,
Villingen, Black Forest, Germany
Filed Jan. 21, 1963, Ser. No. 252,757
Claims priority, application Germany, Jan. 20, 1962,
K 45,730
15 Claims. (Cl. 235—30)

The present invention relates to a rate varying arrangement for a taximeter, and more particularly to a taximeter in which the fare indicating means first operate to indicate the fare in accordance with a first rate, and then indicate the fare in accordance with a second rate after arriving at a position indicating a preselected fare.

Taximeters of the type to which the present invention relates have a control shaft which may be driven by an electric motor, or by an electromagnetic device. The control shaft is turned between a plurality of control positions in which the taximeter is set to different operational conditions of the taxicab, such as a condition "vacant" when the taxicab is unoccupied, a condition "cash" when the fare is indicated, but the taxicab is stopped, and other conditions corresponding to the operation of the taxicab at different rates. The drive of a taximeter from the wheels of a car, or from a clockwork if the taxicab has stopped, and the actuation of indicating devices may also be controlled by the control shaft.

Taximeters with a control shaft of such type and its method of operation are described in the United States patent applications, Ser. No. 76,253, filed December 16, 1960, of Wilhelm Haupt, and Ser. No. 835,895, filed August 25, 1959, of Wilhelm Haupt.

In known taximeters, a start switch in the circcuit of the motor effects turning of the control shaft, and as soon as the control shaft has been turned to the next control position thereof, the motor is automatically disconnected by switch means controlled by the control shaft. Consequently, a manual operation by the driver is required for setting the taximeter to a different rate.

In accordance with police regulations in many cities, it is necessary that the taximeter is set to operation at a different rate when a predetermined fare has been reached, and is indicated by the indicating means of the taximeter. A manual setting of the taximeter to operation at the different rate when the predetermined fare is reached, is impractical, and it has been proposed to automatically set the taximeter to a second rate after the taxicab has travelled a predetermined distance, or for a certain time, resulting in a certain fare.

It is one object of the present invention to improve the rate varying arrangements for taximeters in accordance with the prior art, and to provide an automatic rate varying arrangement for setting a taximeter to a different rate when a predetermined fare is indicated by the indicating means, or is represented by a preselected position of other fare representing means, such as the shaft which is driven from the wheels of the car, and from the clockwork of the taximeter.

Another object of the invention is to provide a rate varying arrangement for this purpose, which can be adjusted and set to different predetermined fares at which the change from one rate to another tariff takes place.

Another object of the present invention is to provide a rate varying arrangement for a taximeter in which switching means in the circuit of the electric moving means for the control shaft, are operated under control of fare representing means to set a taximeter to an operation in accordance with a different fare when the fare representing means have arrived in a preselected position corresponding to a predetermined fare.

With these objects in view, the present invention relates to a rate varying arrangement for a taximeter which accomplishes the automatic setting of the taximeter to a different rate when the fare indicating means, or other fare representing means, such as a shaft driven from the wheels of the car, from a clockwork, or from the wheels and from a clockwork, arrive at a preselected position corresponding to a predetermined fare.

One embodiment of the invention comprises control means, such as the standard control shaft of a taximeter, movable between a plurality of positions associated with different rates, electric moving means, such as a motor, for moving the control means between the positions thereof, switching means connected into the circuit of the electric moving means, and operating means actuated by the fare representing means In accordance with the present invention, the operation of the electric moving means is started in at least one preselected position of the fare representing means, and the electric moving means turns the control means automatically to another position in which the fare representing means or indicating means operates in accordance with another rate. The control means are operatively connected to the fare representing means to effect in different control positions movements of the fare representing means at different speeds corresponding to different rates. This is accomplished by a transmission means shiftable between a plurality of stages for driving a fare representing means, such as the fare indicating means, at different speeds corresponding to different rates if the fare representing means are driven from the wheels of the car.

In accordance with one embodiment of the invention, mechanical operating means are provided which include a turnable stepping wheel which is stepwise shifted by a pawl reciprocated by the fare representing means. In a predetermined position of the stepping wheel, depending on the preselected fare, the stepping wheel effects closing of the switching means and thereby start of the electric moving means and turning of the control means to another position corresponding to a different rate.

The angular distance through which the stepping wheel turns is preferably adjustable for selecting the position of the fare indicating means, and thereby the fare, at which the shifting to a different rate takes place.

Another embodiment of the present invention provides a set of ordinal switches respectively associated with the ordinal elements of the fare indicating means. Each number wheel of the fare indicating means includes an indicator ring carrying indicia, and a cam by which the corresponding ordinal switch is actuated. By turning of the cam relative to the indicator ring, the digit in the respective order of the preselected fare can be determined.

The ordinal switches are connected in series with a relay which operates relay contacts connected in series with the electric motor of the control means, and with contact means controlled by the control shaft.

The automatic disconnection of the motor of the control means in certain control positions is automatically effected by switches controlled by the control shaft.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is a fragmentary perspective view illustrating a rate setting arrangement according to one embodiment of the invention, conventional parts of the taximeter being omitted for the sake of simplicity and clarity;

FIG. 2, FIG. 3, and FIG. 4 are fragmentary side views, partially in section, illustrating on an enlarged scale successive operational positions of a device forming part of the embodiment of FIG. 1;

FIG. 4a is a diagram of the electric circuit of the embodiment of FIGS. 1–4;

FIG. 5 is a fragmentary perspective view illustrating another embodiment of the invention, conventional parts of the taximeter, as well as other parts common with the embodiment of FIG. 1, being omitted for the sake of simplicity and clarity;

FIG. 7a is a side view, partially in cross section, illustrating a device forming part of the embodiment of FIG. 5; and FIG. 7b is an axial sectional view taken on line 7b—7b in FIG. 7a.

Figure 1:
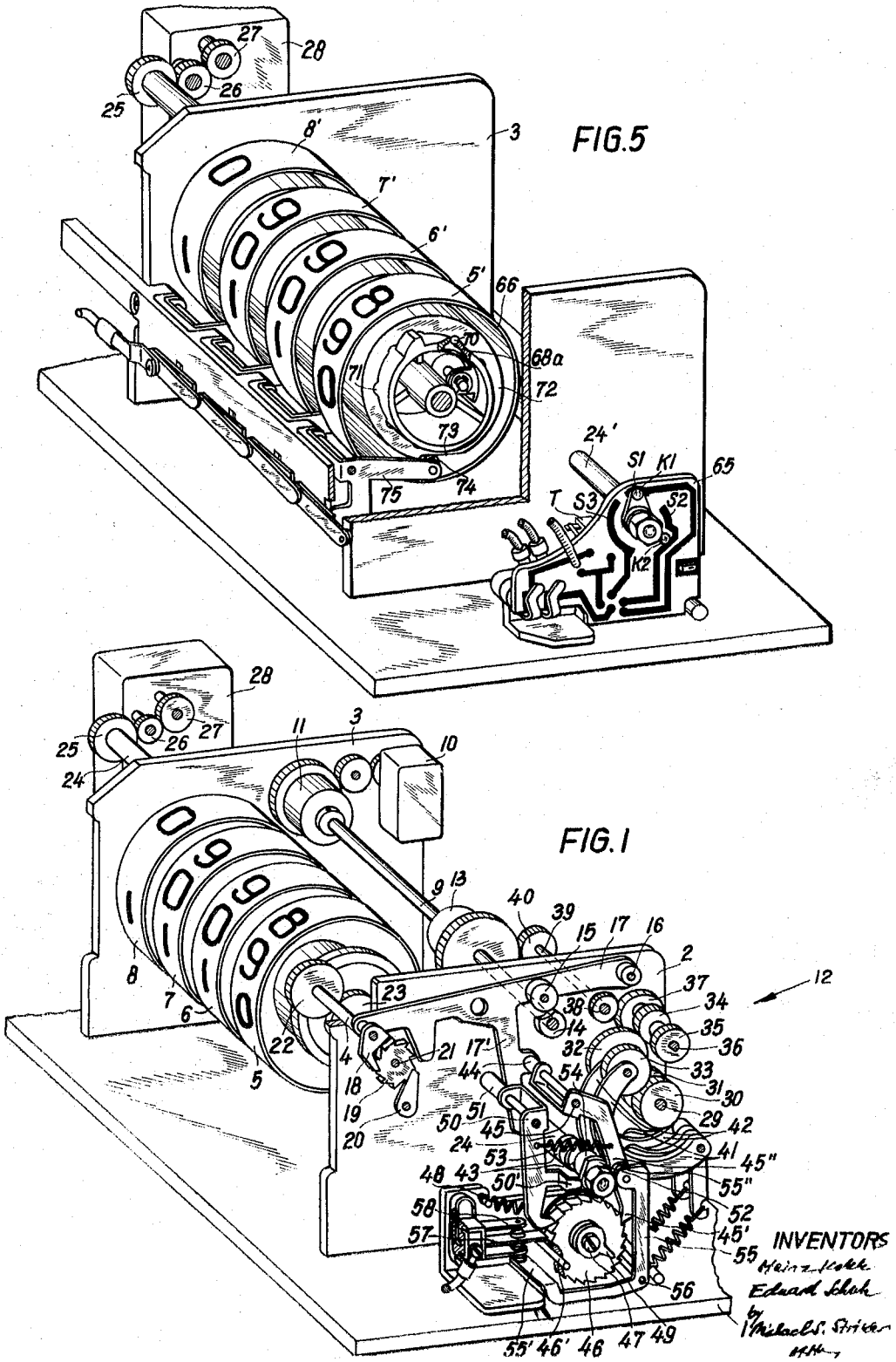

Referring now to the drawings, and more particularly to FIG. 1, two supporting walls 2 and 3 are mounted on the base 1 of the taximeter. Fare indicating means including number wheels 5, 6, 7, 8 are turnably mounted on the walls 2 and 3. A stepping wheel 19 is secured to a shaft 21 which drives through a gear 22, a gear 23 which is connected to the number wheel 5 of the lowest order of the fare indicating means. A lever 17 is mounted on a pivot pin 16, and carries a pawl 18 cooperating with stepping wheel 19 so that raising and lowering of lever 17 effects turning of the stepping wheel 19, and of the fare indicating means. A locking pawl 20 prevents a turning of the stepping wheel 19 in the opposite direction.

A shaft 9 is mounted on walls 2 and 3, and carries a cam 14 which cooperates with a roller 15 to raise and lower lever 17 in accordance with the rotary speed of shaft 9.

A clockwork mechanism 10 is mounted on wall 3 and drives shaft 9 through a gear train and a one-way ball clutch 11, unless shaft 9 is driven at greater speed from a gear 40 through a one-way ball clutch 13. Gear 40 is driven through transmission means generally indicated at 12 from a shaft 29 which is connected to the wheels of a car provided with a taximeter in a manner which is well known, and not an object of the present invention.

The taximeter is assumed to have two rates so that the transmission means 12 includes two stages for driving shaft 9.

The drive shaft 29 carries two gears 30 and 31 which cooperate with a pair of gears 32 and 33 mounted on pivoted arms 41 and 42. Arms 41 and 42 have cam follower portions cooperating with cams 43 on a control shaft 24 which is mounted on walls 2 and 3 and has at its remote end, a gear 25 connected by a gear train 26, 27 to an electric drive motor 28. When motor 28 turns control shaft means 24 to a first fare changing control position, arm 41 will be displaced by a cam 43 so that gear 33 of the first stage of transmission 12 is moved to a position simultaneously meshing with gears 30 and 35. When control shaft means 24 is turned to another fare changing position, another cam 43 moves arm 42 to a position in which gear 32 of the second transmission stage meshes with gears 31 and 34 so that in accordance with the position of control shaft means 24, different stages of the transmission 12 are effective to turn shaft 36 on which gears 34 and 35 are mounted. Control shaft means 24 has other control positions corresponding to other conditions of the taxicab, for example, while the fare is being paid, or while the taxicab is free. Shaft 36 also carries a gear 37 meshing with gear 38 on shaft 39 which carries gear 40. Consequently, shaft 9 can be driven at different speeds, and such different speeds are associated with different rates. If the taxicab stops, the clockwork 10 will rotate shaft 9 so that in any event the fare indicating means 5, 6, 7, 8 are driven through the mechanism 14, 15, 17, 18, 19, 21, 22, and 23.

While the number wheels 5 to 8 indicate the fare, it will be understood that the shaft 9 represents the fare by the number of its revolutions, and consequently shaft 9 as well as indicating number wheels 5–8 may be considered as a fare representing means driven from the wheels of the car through transmission means 12 which include two stages which are alternately operative and respectively represent two different rates.

Figure 2:
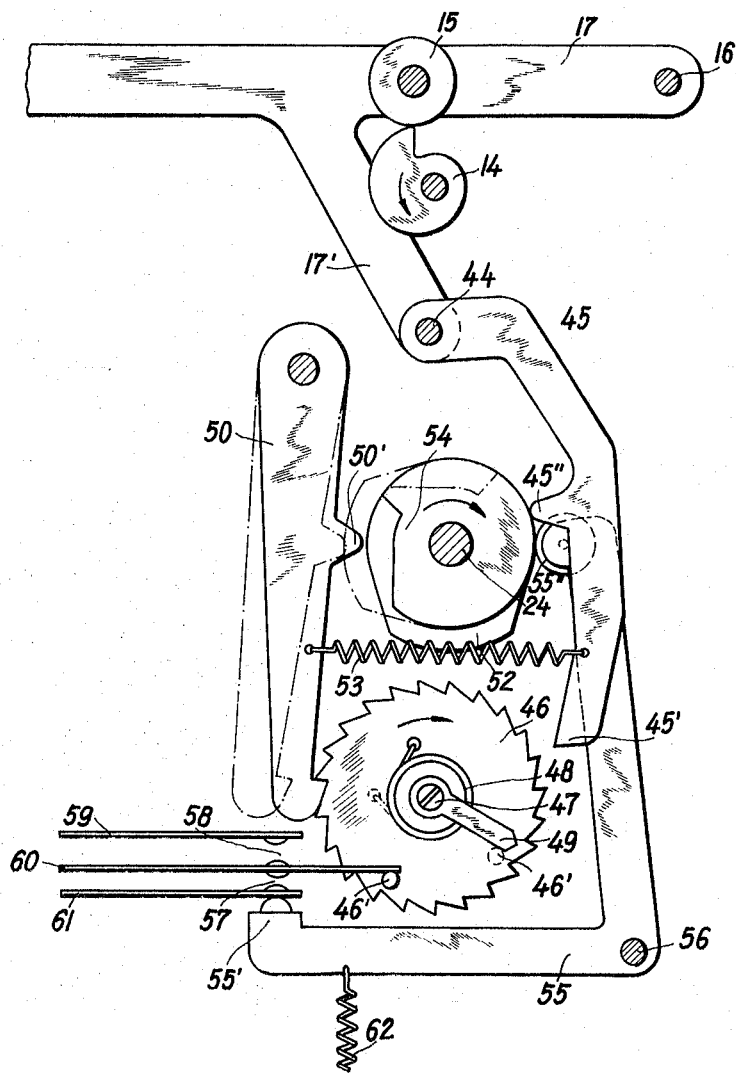

Lever 17 which drives the fare indicating means 5 to 8 in accordance with the position of the fare representing shaft means 9, has an arm 17' on which an operating member 45 is pivotally mounted by means of a pin 44, as best seen in FIGS. 2 to 4. Operating member 45 has an end portion 45' formed as a pawl cooperating with a toothed stepping wheel 46 which is mounted for turning movement on a shaft 47. Stepping wheel 46 has a projecting pin 46', and is biased by a spring 48, which is secured to shaft 47 and to wheel 46, to turn in counter-clockwise direction as viewed in the drawing, to the position shown in FIG. 3 in solid lines, in which position projecting pin 46' abuts a stop 49 fixed on the stationary shaft 47.

A locking pawl 50 is mounted on a projecting shaft 51 which is secured to wall 2. Locking pawl 50 is connected by a spring 53 to operating member 45, so that the pawl portion 45' and the end portion of locking pawl 50 are urged to engage the stepping wheel 46 in the position illustrated in FIG. 3.

Operating member 45 and its pawl portion 45', and locking pawl 50 are so arranged and constructed that only one of the pawls fully engages a notch between two teeth of stepping wheel 46, while the other pawl is offset to the teeth and notches of stepping wheel 46 a distance corresponding to half the pitch. For example, if locking pawl 50 is in the position shown in FIG. 3, pawl portion 45' will be in the position shown in broken lines in FIG. 3, fully engaging a notch in stepping wheel 46. When locking pawl 50 is in the position shown in full lines in FIG. 4, pawl portion 45' will be offset relative to the teeth and notches of the stepping wheel 46. For reasons which will become apparent hereinafter, the relative displacement between the two pawls is a little less than half between the pitch of the teeth of the stepping wheel.

The shoulder of cam 14 of fare representing means 9 has such a height that operating member 45, 45' is actuated by lever 17 to move a distance which is slightly greater than the pitch of the stepping wheel 46.

Locking pawl 50 has a cam follower projection 50', and operating member 45 has a cam follower projection 45" which cooperate, respectively, with control cams 52 and 54 on control shaft means 24 under the action of spring 53.

An angular operating lever 55 is mounted for rocking movement about a pin 56 which is secured to wall 2. A spring 62 biases operating lever 55 to turn to a position in which a cam follower roller 55" cooperates with cam 52 by which locking pawl 50 is controlled.

The other end 55' of operating lever 55 operates switching means shown to include three contact springs 59, 60 and 61 on which a first pair of contacts 57, and a second pair of contacts 58 is provided. Contact spring 60 extends into the circular path of movement of projecting pin 46'. The switching means 57 to 61 are connected into the circuit of the electric motor 28 which drives control shaft means 24 through the gear train 25 to 27, as explained with reference to FIG. 1. When either contact means 57, or contact means 58 is closed, motor 28 is connected to a voltage, and starts to rotate control shaft means 24 with cams 43, 52 and 54. Motor 28 can also be started by a manually operated switch, not shown, and the motor may then be disconnected automatically by control shaft means 24.

As in conventional taximeters, control shaft 24 is turnable between a plurality of control positions. One control position corresponds to an indication "vacant" in which the taxicab is unoccupied and the taximeter does not operate. A plurality of control positions of control shaft means 24 are associated with different rates, corresponding to the number of stages of transmission means 12. The taximeter indicates fares calculated in accordance with two different rates. A further control position may be indicated "cash," and in this position, shaft 9 will not be driven and the stopped fare indicating means 5 to 8 will indicate the fare.

Referring to the electric circuit diagram of FIG. 4a the function of the mechanical rate changing parts shall now be explained in connection with the electrical switching parts.

The motor 28 is switched in series with a resistor R1, a relay contact $a$ which cooperates with contacts $a8$ or $a10$, and a contact $c$, which cooperates with contacts $c5$ or $c7$. For the purpose of spark absorption a capacitor $c1$ is connected to the positive and negative terminals of a battery. In the position shown in FIG. 4a contacts $a8$, 9 and $c5$, 6 cause a short circuiting of the motor coil of motor 28 so that the motor is at standstill. To start the motor in forward turning direction, relay contact $a9$, 10 is closed by means of relay A. Relay A is switched in series with the following switching parts: Relay A, diode D1, contacts $c8$, 9, contacts $b8$, 9 and key-switch T1. The diode D1 serves to avoid an operation of relay A when the battery is connected thereto in the wrong circuit direction. Switched in parallel to key-switch T1 are holding contacts $a6$, 7, which are also operated by relay A. Relay B serves to perform certain control and holding functions in the various phases of a switching operation.

In the circuit of relay B there is a switch $nk2$ which is operated by a cam secured to shaft 24. In the line between switch $nk2$ and relay B there is a diode D2 provided. A diode D3 connects contacts $b8$ and $c9$, establishing a connection between the circuit of relay B and relay A.

A relay C which controls contacts $c5$, 6, 7 and $c8$, 9, 10 is provided for initiating a reverse rotation of motor 28. This relay C is connected in series with a switch T2 and contacts $b5$, 6. A contact C10 is connected in parallel to contact $b5$. The contacts 59 and 61 are connected in parallel and connected to the negative pole of diode D1 in the relay circuit of relay A. FIG. 4a shows all contacts in the rest position.

*Operation*

FIG. 2 illustrates in chain lines the position of locking pawl 50, and of cams 52 and 54 in the control position of control shaft means 24 corresponding to the control position "vacant" in which the taxicab is unoccupied. Operating members 45 and 55 are in the position illustrated in solid lines in FIG. 2. Cam 52 has moved locking pawl 50, and cam 54 has moved operating pawl 45' out of engagement with stepping wheel 46. When the start switch T1 is actuated by the driver, relay A is energized over the contacts $b9$, 8, $c9$, 8 and diode D1, whereby contacts $a9$, 10 and $a6$, 7 are closed. Over resistor R1 contacts $a9$, 10 and $c5$, 6 the motor is started. Over contacts $a6$, 7 the circuit of relay A is held so that relay A is not deenergized upon the return of switch T1 to its open rest position. When the motor 28 turns shaft 24, the contacts of the cam switch $nk2$ are closed and relay B is energized. Relay B opens the contact connections between contacts $b8$, 9 and $b5$, 6 so that the function of contacts $b8$, 9 is now taken over by cam switch $nk2$. Relay A remains now energized over cam switch $nk2$, diode D3, contacts $c9$, 8, and diode D1 and motor 28 turns shaft 24. Only when shaft 24 has been turned 90° from the initial position shown in chain lines in FIG. 2, cam switch $nk2$ opens—as this is shown in FIG. 4a—so that relay A is deenergized and the motor circuit interrupted through the switching of contacts $a10$, 9 to $a8$, 9. The cams 52 and 54 on shaft 24 now take up the position shown in FIG. 3.

At the same time, one cam 43 on control shaft 24 operates arm 41 to actuate the first stage of transmission 12 so that fare representing shaft 9 is driven through gears 30, 33, 35, 37, 38, 40, see FIG. 1, from the wheels of the taxicab at a speed corresponding to a first rate. However, lever 17 is locked in its higher position by means, not shown, which are automatically placed in position when the taximeter starts its operation so that a basic charge for a certain mileage is indicated by the indicator means, as it is conventional in taximeters. When the taxicab has been driven a distance corresponding to the basic charge, the locking of lever 17 is automatically released, so that cam 14, rotating at a speed corresponding to the first rate, raises and lowers lever 17 whereby the fare indicating means 5 to 8 are driven through the stepping mechanism 18, 19 and 20, see FIGS. 1 to 4. At the same time, lever 17 actuates operating member 45 through arm 17' so that pawl portion 45' moves from the position shown in solid lines in FIG. 3 to the position shown in broken lines whereby stepping wheel 46 is shifted in clockwise direction as indicated by an arrow, and turns an angular distance corresponding to substantially one and a half of the pitch of stepping wheel 46. Locking pawl 50 slides on the teeth of stepping wheel 46 during this turning movement, but when the angular step has been terminated, spring 48 is effective to turn stepping wheel 46 in the opposite counterclockwise direction until a tooth of stepping wheel 46 abuts locking pawl 50. Stepping wheel 46 is thus turned in the opposite counterclockwise direction half the pitch of the teeth of stepping wheel 46, so that the entire operation results in the turning of the stepping wheel 46 through an angular distance corresponding to the angular spacing of two adjacent teeth. Every time cam 14 turns one revolution, stepping wheel 46 is thus actuated to turn one step in clockwise direction, so that pin 46' travels away from the fixed stop 49 until it engages the underside of spring 60 and raises the same while moving to the position 46''' illustrated in chain lines in FIG. 3. In this position, pin 46' has raised contact spring 60 so high so that contacts 58 are closed, whereby motor 28 is automatically started by relay A, as described above, to turn control shaft 24 so that cams 52 and 54 are turned to the position shown in FIG. 4. At the same time, cams 43 on control shaft 24 are turned to a position in which transmission 12 is shifted by arm 42 to a position in which the second stage, corresponding to a second rate, is effective to rotate fare representing shaft 9 at a different speed corresponding to the different rates. When control shaft 24 has assumed the position shown in FIG. 4 associated with the second rates, motor 28 is automatically disconnected by switch means $nk2$ operated by control shaft 24.

In the control position of FIG. 4, control cam 54 has turned operating pawl 45' to a position releasing the teeth of stepping wheel 46 so that stepping wheel 46 is no longer blocked against turning movement in counterclockwise direction, permitting spring 48 to turn stepping wheel 46 half a step in counterclockwise direction until a tooth abuts locking pawl 50. Pin 46' is turned back a corresponding distance, and permits contact spring 60 to move to the position illustrated in FIG. 4 in chain lines in which position contacts 58 are separated. However, pin 46' does not permit spring 60 to return to its initial straight position shown in FIG. 3. In this position of spring 60, motor 28 cannot be again started after having been disconnected by the switch means $nk2$ operated by control shaft 24.

In the control position illustrated in FIG. 4, cam 52 has turned operating lever 55 in clockwise direction so that end portion 55' engages contact springs 51 and raises the contact end of the same. However, contact 57 cannot be yet closed since contact spring 60 is in the slightly raised position illustrated in chain lines in FIG. 4.

It is evident that contacts 57 will close when contact spring 60 assumes the initial straight position shown in solid lines. This will occur if the taxicab arrives at its destination before pin 46' has travelled from the solid line position in FIG. 3 far enough in clockwise direction to engage the contact spring 50 in its straight initial position. For example, pin 46' may only have travelled to the position 46" when the taxicab is stopped, and the driver also shifts the taximeter to the "cash" position in which also the clockwork drive 10, 11 is disconnected, and the fare is indicated by the stopped indicator wheels 5-8.

In this event, the driver actuates switch $T_1$ to start motor 28 to turn control shaft means 24 from the position corresponding to the first rate shown in FIG. 3, to the cash position skipping the position corresponding to the second tariff.

When the taxicab has reached its destination, the driver operates the motor start switch $T_1$ so that motor 28 turns control shaft 24 to the "cash" control position shown in FIG. 2 in solid lines. In this control position, operating lever 55 is not displaced by cam 52 so that contacts 57 are open. Locking pawl 50 engages stepping wheel 46 and prevents turning of the same by spring 48. Pawl 45' is retracted from the stepping wheel 46.

When the motor switch is again operated by the driver, motor 28 turns control shaft 24 to the "free" position illustrated in chain lines in FIG. 2 so that cam 52 moves locking pawl 50 to an inoperative position releasing the stepping wheel 46 so that spring 48 turns the same in counterclockwise direction until pin 46' has moved back from the position shown in solid lines to the position shown in chain lines abutting fixed stop 49.

The exact angular position of stop 49 can be adjusted by a holding screw which secures stop 49 to the end of shaft 47. In this manner, the device can be adjusted to shift from one tariff to another tariff after a shorter or longer travel of pin 46' between stop 49 and contact spring 60, corresponding to a different distance of travel of the taxicab in the position corresponding to the first rate, before the second rate is rendered effective.

Figure 6:
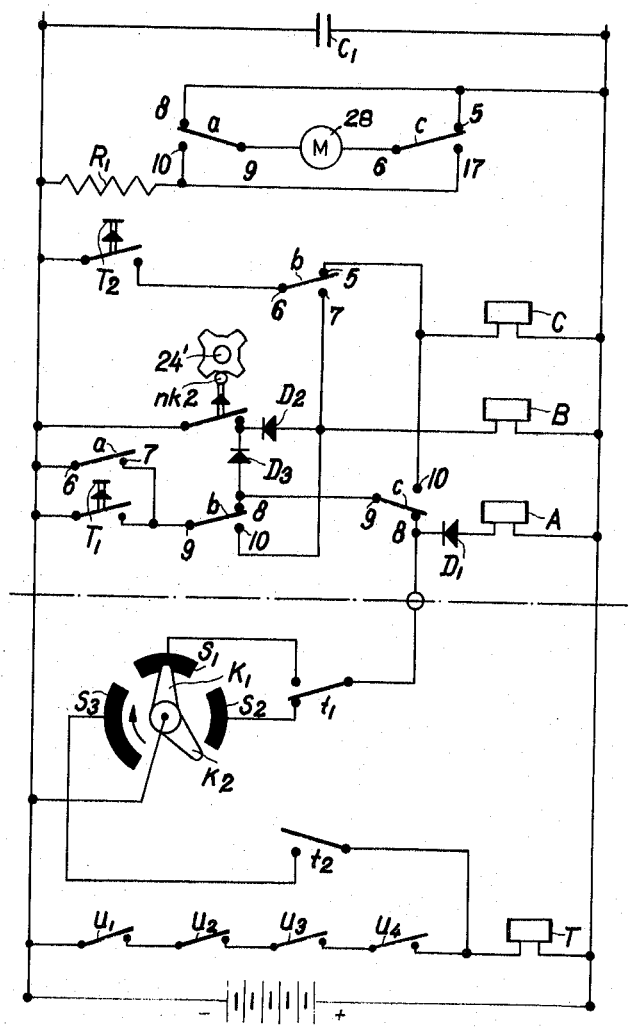
FIG. 6 is a diagram illustrating the circuit of the embodiment of FIG. 5.

The second embodiment of the invention is illustrated in FIG. 5, in which the transmission means 12, the fare representing means 9, the clockwork 10, and the mechanism 17, 14, 18, 19 are omitted for the sake of clarity and simplicity. Instead of the mechanical construction including the stepping wheel of the first embodiment, a contact plate 65 is provided in the embodiment of FIG. 5 on which three part-circular contacts S1, S2 and S3 are provided. Contacts S1, S2 and S3 and conductors connecting the same into a circuit shown in FIG. 6, are made in the form of a printed circuit on contact plate 65. Control shaft means 24' carries two contact arms provided with contacts K1 and K2. During turning of control shaft 24', contact K1 cooperates with stationary contacts S1 and S3, and contact K2 cooperates with contacts S2 and S3.

In the position of control shaft 24' corresponding to the "vacant" indication of the taximeter in which the taxicab is unoccupied, contact K1 engages contact S3, and contact K2 is located in the gap between the contacts S1 and S2 engaging none of them. In the control position of shaft 24' corresponding to the first rate, contact K1 engages contact S1, as shown in FIG. 5, and contact K2 does not engage any one of the contacts S1, S2, S3, since a cutout is provided in contact S2. In the control position corresponding to the second rate, contact K1 engages contact S2, and K2 engages contact S3. In the control position corresponding to "cash," contact K2 engages contact S3, and contact K1 is located in the gap between the contacts S2 and S3 and does not engage the same.

The construction of the fare indicating means is best seen in FIGS. 5, 7a and 7b. Each ordinal number wheel 5' to 8' includes an indicator ring 66 on which indicia are provided, and which is secured by screws 67 to a coupling wheel 68 which has a radial bore 69 in which a coupling ball 70 is located. An annular cam 72 surrounds coupling wheel 68 and has ten recesses or notches in the inner surface thereof, any one of which can be engaged by ball 70, which is urged outwardly, and prevented from dropping into the interior of coupling wheel 68, by a leaf spring 68a secured to the inner surface of coupling wheel 68.

A relay means T is secured to the rear face of contact plate 65 and operates two relay contacts $t1$ and $t2$, as best seen in FIG. 6. Relay contact $t1$ has two positions respectively connected in series with contact S1 or contact S2, and with motor 28. Relay contact $t2$ has an open position and a closed position connected in series with contact S3 and with relay T. Four ordinal switches $u1$, $u2$, $u3$, and $u4$ are connected in series with each other and with relay T, and are connected in parallel with contacts S3, $t2$. The annular cam 72 of each number wheel has a lower cam track portion 73 as shown in FIGS. 7a and 5. Ordinal switches $u1$, $u2$, $u3$, and $u4$ are respectively associated with the ordinal number wheels, and each contact is operated by an operating member 75 having a cam follower roller 74 engaging the outer cam surface of the respective cam 72. When roller 74 is located in the position of FIG. 7a engaging the low portion of the respective cam 72, the respective contact $u$ is closed, but when a portion of the circular cam track of cam 72 engages roller 74, operating member 75 is turned in clockwise direction and opens the corresponding contact $u$. Since the relative position between each annular cam 72 and its low track portion 73 and the respective number wheel 66 and coupling wheel 68 can be changed by turning cam 72 between ten angularly displaced positions coupled by ball 70 to coupling wheel 68, the position of the number wheel in which the respective contact $u$ is open, can be selected.

Cams 72 of each number wheel are turned to such a position that a selected fare is indicated by the number wheels 5' to 8', when the low track portions 73 of all cams 72 are aligned in the position shown in FIG. 7a so that all contacts $u$ are closed. Consequently, when the fare indicating means 5' to 8' are in a certain position indicating or representing a selected fare requiring switching of the mechanism from operation at the first rate to operation at the second rate, the contacts $u1$ to $u4$ will be closed.

The embodiment of FIG. 5 is operated as follows: It is assumed that the cams 72 are set to a selected fare at which the second rate is to be in force. However, the taximeter is in the "vacant" control position, so that no fare is indicated and consequently at least one contact $u1$ is open. Contacts K1 and K2 are in a position in which K1 engages S3 and K2 does not engage one of the contacts S1 to S3.

The driver operates the main switch $T_1$ for starting motor 28 so that control shaft means 24' turns to the position illustrated in FIG. 5 which corresponds to the first rate. In this position, contact K1 engages contact S1, as also shown in FIG. 6.

The number wheels 5' to 8' are now operated by the mechanism 9, 17 to 23, as explained with reference to FIG. 1, so that the number wheels 5' to 8' successively arrive in positions in which the contacts $u1$ to $u4$ close. When all contacts $u1$ to $u4$ are closed, the indicated fare is the fare at which the second rate is to be used during the further travel of the taxicab.

When all contacts $u1$ to $u4$ are closed, the relay T is energized, and actuates the relay contacts $t1$ and $t2$. Since contact K1 engages contact S1 in the position of FIG. 6 where the first rate was effective, the motor is connected to voltage by the shifted relay contact $t1$, and rotates conrol shaft 24' an angle of 90° to a second control position in which contact K1 engages contact S2, and contact K2 engages contact S3. At the same time, cams 43, not shown, provided on shaft 24' as described for shaft 24 with reference to FIG. 1, have shifted transmission means 12, as described, by operating arm 42 so that the second stage of the transmission 12 is effective to drive the representing and fare indicating means at a different speed corresponding to the second rate, as explained with reference to FIG. 1. Relay T remains energized in this position since not only contacts $u1$ to $u4$, but also contacts K2, S3 and relay contact $t2$ are closed. In FIG. 6 the upper part of the circuitry controlling the motor M is the same as that shown in the upper part of FIG. 4a and its method of operation is explained with reference to FIG. 4a.

Motor 28 is disconnected since relay contact $t1$ is still in its upper position as viewed in FIG. 6 while contact K1 is no longer connected to contact S1. Consequently, motor 28 stops when the fare representing and indicating means arrive at the position in which the transmission means is shifted to the second tariff.

During further travel of the taxicab, contacts $u1$ to $u4$ successively open, but relay T remains energized through contacts K2, S3 and $t2$. When the taxicab has arrived at its destination, and the driver operates the motor start switch to start motor 28 again so that control shaft 24' turns to the "cash" position, contacts K1, S2 open which has no effect since relay contact $t1$ is still in its upper position, and contact S1 is open.

When the driver operates the motor switch to turn the control shaft to the "vacant" position, contacts K2 and S3 separate so that relay T is de-energized whereupon relay contacts $t1$ and $t2$ return to the initial position illustrated in FIG. 6.

In the event that the fare representing and indicating means have not reached the selected preset position in which all ordinal switches $u1$ to $u4$ are closed in accordance with the preset fare at which the second rate is to be used, it is necessary to shift the device directly from the control position corresponding to the first tariff to the "cash" position.

In the control position corresponding to the first rate, contact K1 engages contact S1, while contacts S2 and S3 are open. When the main switch $T_1$, is operated by the driver, control shaft 24' turns to a position in which contact K1 moves away from contact S1 and engages contact S2. At the same time contact K2 engages contact S3 in the position corresponding to the second tariff. However, since the relay T is not energized before the fare indicating means arrives in the preselected position closing all contacts $u1$ to $u4$, relay contact $t1$ is still in the initial position shown in FIG. 6 so that motor 28 is connected into the circuit when the contact K1 engages contact S2. Motor 28 turns control shaft 24' until the device arrives in the "cash" position, in which control shaft 24' opens contact means $nk2$ to disconnect the motor.

In the embodiment of FIG. 5 the fare at which the change from the first rate to the second tariff is to take place, can be accurately set in all orders of the indicating means, including the lowest order. In the embodiment of FIG. 1, the fixed stop 49 has to be set, and during this operation, the selected fare cannot be observed on the indicating means. In the embodiment of FIG. 5, the selected fare can be accurately set on the indicating means, and thereupon the annular cams 70 adjusted and set until the lower cam portions 73 are aligned, and all contacts $u$ closed.

Furthermore, the embodiment of FIG. 5 permits the automatic shifting of the taximeter for operation at three rates, which requires only the provision of an additional lower track portion 73 on each cam 72.

It will be understood that each of the elements described above, or two or more together, may also find a useful application in other types of taximeters differing from the types described above.

While the invention has been illustrated and described as embodied in automatic tariff setting arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Rate varying arrangement for a taximeter, comprising, in combination, fare representing means; control means including a control shaft movable between a plurality of positions including two rate changing positions associated with different rates and being operatively connected with said fare representing means to effect in said rate changing positions movements of said fare representing means at different speeds corresponding to different rates; electric motor means for moving said control means shaft between said positions; means actuated by said control means for stopping said motor means and thereby said control shaft in each of said positions of the same switching means connected into the circuit of said electric motor means; and operating means for said switching means coupled by said control means in one of said rate changing positions to said fare representing means so as to be actuated by said fare representing means to operate said switching means to start operation of said electric motor means in at least one preselected position of said fare representing means whereby said control means is moved by said electric motor means automatically from said one rate changing position to the other rate changing position so that said fare representing means operates from said preselected position on in accordance with the rate associated with said other rate changing position.

2. Rate varying arrangement for a taximeter, comprising, in combination, fare representing means; control means including a control shaft movable between a plurality of positions including two rate changing positions associated with different rates and being operatively connected with said fare representing means to effect in said rate changing positions movements of said fare representing means at different speeds corresponding to different rates, said control shaft having cam means; electric motor means for moving said control means shaft between said positions; means actuated by said control means for stopping said motor means and thereby said control shaft in each of said positions of the same switching means connected into the circuit of said electric motor means; and operating means including a turnable stepping wheel having a projection travelling along a path in which said switching means is located, a fixed stop, biasing means for biasing said wheel to turn in one direction to a position in which said projection abuts said stop, and operating pawl means, said pawl means being coupled by said cam means of said control shaft in one of said rate changing positions with said stepping wheel, and being in coupled position reciprocated by said fare representing means to turn said stepping wheel in the opposite direction, said projection engaging and operating said switching means when said fare representing means arrives at at least one preselected position related to the angular spacing between said stop and said switching means so that said switching means starts operation of said electric motor means in at least one preselected position of said fare representing means whereby said control means is moved by said electric motor means automatically from said one rate changing position to the other rate changing position so that said fare representing means operates from said preselected position on in accordance with the rate associated with said other rate changing position.

3. Rate varying arrangement for a taximeter, comprising, in combination, fare representing means; control means including a control shaft movable between a plurality of positions including two rate changing positions associated with different rates and being operatively connected with said fare representing means to effect in said rate changing positions movements of said fare representing means at different speeds corresponding to different rates; electric motor means for moving said control shaft between said positions; means actuated by said control means for stopping said motor means and thereby said control shaft in each of said positions of the same switching means connected into the circuit of said electric motor means; and operating means including a turnable stepping wheel having a projection traveling along a path in which said switching means is located, a shaft supporting said wheel for turning movement, a stop secured to said shaft angularly adjustable thereon between selectable angular stop positions, biasing means for biasing said wheel to turn in one direction to a position in which said projection abuts said stop, and operating pawl means, said pawl means being coupled by said cam means of said control shaft in one of said rate changing position with said stepping wheel, and being in coupled position reciprocated by said fare representing means to turn said stepping wheel in the opposite direction, said projection engaging and operating said switching means when said fare representing means arrives at at least one preselected position related to the angular spacing between said stop and said switching means so that said switching means starts operation of said electric motor means in at least one preselected position of said fare representing means whereby said control means is moved by said electric motor means automatically from said one rate changing position to the other rate changing position so that said fare representing means operates from said preselected position on in accordance with the rate associated with said other fare changing position, said preselected position of said fare representing means depending on the length of said path between said switching means, and said stop in a selected stop position.

4. Rate varying arrangement for a taximeter, comprising, in combination, fare representing means; control means including a control shaft movable between a plurality of positions including two rate changing positions associated with different rates and being operatively connected with said fare representing means to effect in said rate changing positions movements of said fare representing means at different speeds corresponding to different rates; electric motor means for moving said control means shaft between said positions; switching means connected into the circuit of said electric motor means, said switching means including two contact means, each connected in series with said electric motor means; an operator influenced start switch for starting said electric motor means to turn said control shaft to one of said rate changing position; first operating means including a turnable stepping wheel having a projection travelling along a path in which said switching means is located, a fixed stop, biasing means for biasing said wheel to turn in one direction to a position in which said projection abuts said stop, and operating pawl means, said pawl means being coupled by said cam means of said control shaft in said one of said rate changing position with said stepping wheel, and being in coupled position reciprocated by said fare representing means to turn said stepping wheel in the opposite direction, said projection engaging and operating said switching means to close one of said contact means when said fare representing means arrives at at least one preselected position related to the angular spacing between said stop and said switching means so that said switching means starts operation of said electric motor means in at least one preselected position of said fare representing means whereby said control means is moved by said electric motor means automatically from said one rate changing position to the other rate changing position so that said fare representing means operates from said preselected position on in accordance with the rate associated with said other rate changing position; and second operating means actuated by said control means in said other rate changing position to operate the other contact means of said switching means so that said electric motor means turns said control means to the next following position.

5. An arrangement as set forth in claim 4 wherein said control means includes control cam means; whereas said operating pawl means has a cam follower cooperating with said control cam means; and including a locking pawl cooperating with said stepping wheel, the arrangement being such that said operating pawl turns said stepping wheel farther than one step to an actuating position whereupon said biasing means turns said wheel back until stopped by said locking pawl in a position turned only one step whereby said one contact means is closed and then opened again by said projection.

6. Rate varying arrangement for a taximeter, comprising, in combination, fare representing means including fare indicating means having a plurality of ordinal indicator rings and coupling wheels respectively secured to sad indicator rings and driven to indicate the fare; control means including a control shaft movable between a plurality of positions including two rate changing positions associated with different rates and being operatively connected with said fare representing means to effect in said rate changing positions movements of said fare representing means at different speeds corresponding to different rates; electric motor means for moving said control shaft between said positions; means actuated by said control means for stopping said motor means and thereby said control shaft in each of said positions of the same switching means connected into the circuit of said electric motor means; and operating means including a plurality of cams, each cam having an operating element and being coupled to one of said coupling wheels for turning movement with the same, at least one cam being turnable relative to the corresponding coupling wheel so as to be adjustable between a plurality of positions in which said element is associated with different indications on the respective indicator ring whereby a fare can be preselected, said element moving along a path in which said switching means is located so as to operate the same to start operation of said electric motor means in at least one preselected position of said fare indicating means whereby said control means is moved from said one rate changing position to the other rate changing position so that said fare indicating means operates from said preselected position on in accordance with the tariff associated with said other rate changing position.

7. Rate varying arrangement for a taximeter, comprising, in combination, fare representing means including fare indicating means having a plurality of ordinal indicator rings and coupling wheels respectively secured to said indicator rings and driven to indicate the fare; control means including a control shaft movable between a plurality of positions including two rate changing positions associated with different rates and being operatively connected with said fare representing means to effect in said rate changing positions movements of said fare representing means at different speeds corresponding to different rates; electric motor means for moving said control means shaft between said positions; means actuated by said control means for stopping said motor means and thereby said control shaft in each of said positions of the same switching means connected into the circuit of said electric motor means and including a plurality of ordinal switches respectively correlated with said indicator rings; and operating means including a plurality of cams, each cam having an operating element and being coupled to one of said coupling wheels for turning movement with the same, each cam being turnable relative to the corresponding coupling wheel so as to be adjustable between a plurality of positions in which said element is associated with different indications on the respective indicator ring whereby a fare can be preselected, said elements moving along parallel paths in which said ordinal switches are located so as to operate said ordinal switches successively, and to actuate all said ordinal switches to start operation of said electric motor means in at least one preselected position of said fare indicating means whereby said control means is moved by said electric motor means automatically from said one rate changing position to the other rate changing position so that said fare indicating means operates from said preselected position on in accordance with the rate associated with said other rate changing position.

8. Rate varying arrangement for a taximeter, comprising, in combination, fare representing means including fare indicating means having a plurality of ordinal indicator rings and coupling wheels respectively secured to said indicator rings and driven to indicate the fare; control means including a control shaft movable between a plurality of positions including two rate changing positions associated with different rates and being operatively connected with said fare representing means to effect in said rate changing positions movements of said fare representing means at different speeds corresponding to different rates; electric motor means for moving said control means shaft between said positions; means actuated by said control means for stopping said motor means and thereby said control shaft in each of said positions of the same switching means connected into the circuit of said electric motor means and including a plurality of ordinal switches respectively correlated with said indicator rings; and operating means including a plurality of cams, each cam having an operating element and being coupled to one of said coupling wheels for turning movement with the same, each cam being turnable relative to the corresponding coupling wheel so as to be adjustable between a plurality of positions in which said element is associated with different indications on the respective indicator ring whereby a fare can be preselected, said elements moving along parallel paths in which said ordinal switches are located so as to operate said ordinal switches successively, and to actuate all said ordinal switches, a plurality of stationary contact means, and movable contact means connected to said control shaft means for movement with the same and successively engaging said stationary contact means in said positions of said control means in series to start operation of said electric motor means in at least one preselected position of said fare indicating means whereby said control means is moved by said electric motor means automatically from said one rate changing position to the other rate changing position so that said fare indicating means operates from said preselected position on in accordance with the rate associated with said other rate changing position.

9. An arrangement as set forth in claim 8 wherein said ordinal switches are connected in series; and including relay means connected in series with said ordinal switches and having relay contacts connected in series with said movable contact means and said electric motor means to effect start of said electric motor means in selected positions of said control means.

10. An arrangement as set forth in claim 7 wherein each of said cams is annular and said element is a lower cam portion; and wherein each of said ordinal switches includes a cam follower arm cooperating with one annular cam and permitting the respective ordinal switch to close when engaging said lower cam portion.

11. Rate varying arrangement for a taximeter for a taxicab, comprising, in combination, fare representing means; drive means for said fare representing means adapted to be driven from the wheels of the taxicab and including transmission means shiftable between a plurality of stages for driving said fare representing means at different speeds corresponding to different rates; control shaft means turnable between a plurality of control positions including two rate changing positions and connected to said transmission means for shifting the same between said stages so that in said rate changing positions said fare representing means operate at different speeds corresponding to first and second rates; electric motor means for turning said control shaft means between said control positions means actuated by said control shaft means for stopping said motor means and thereby said control shaft means in each of said control positions; switching means connected into the circuit of said motor means; and operating means for said switching means controlled by said control shaft means to be coupled in one of said rate changing positions to said fare representing means so as to be actuated by said fare representing means operating at a speed corresponding to said first rate to operate said switching means to start said motor means in at least one preselected position of said fare representing means whereby said control shaft means is turned by said motor means from said one rate changing position to the other rate changing position so that said fare representing means operates from said preselected position on in accordance with second rate associated with said other rate changing position.

12. Rate varying arrangement for a taximeter for a taxicab, comprising, in combination, fare representing means; drive means for said fare representing means adapted to be driven from the wheels of the taxicab and including transmission means shiftable between a plurality of stages for driving said fare representing means at different speeds corresponding to different rates; control shaft means turnable between a plurality of control positions including two rate changing positions and connected to said transmission means for shifting the same between said stages so that in said rate changing positions said fare representing means operate at different speeds corresponding to first and second rates; electric motor means for turning said control shaft means between said control positions; means actuated by said control shaft means for stopping said motor means and thereby said control shaft means in each of said control positions; switching means connected into the circuit of said motor means including three parallel contact springs and two pairs of contacts on said contact springs, the central contact spring having two of said contacts; and operating means for said switching means controlled by said control shaft means to be coupled in one of said rate changing positions to said fare representing means so as to be actuated by said fare representing means operating at a speed corresponding to said first rate to operate said switching means to start said motor means in at least one preselected position of said fare representing means whereby said control shaft means is turned by said motor means from said one rate changing position to the other rate changing position so that said fare representing means operates from said preselected position on in accordance with the second rate associated with said other rate changing position, said operating means including an operating element moving along a path in which said central contact spring is located in alternate longer forward steps and shorter back steps so as to close one pair of contacts and to immediately open the same in said preselected position, and further including an operating lever actuated by said control means in one control position to close the other pair of contacts unless said central contact spring is held by said operating element in said preselected position of said fare representing means.

13. Rate varying arrangement for a taximeter for a taxicab, comprising, in combination, fare representing means including ordinal fare indicating means; drive means for said fare representing means adapted to be driven from the wheels of the taxicab and including transmission means shiftable between a plurality of stages for driving said fare representing means at different speeds corresponding to different rates; control shaft means turnable between a plurality of control positions including two rate changing positions and connected to said transmission means for shifting the same between said stages so that in said rate changing positions said fare representing means operate at different speeds corresponding to first and second rates; electric motor means for turning said control shaft means between said control positions; means actuated by said control shaft means for stopping said motor means and thereby said control shaft means in each of said control positions; switching means including a plurality of motor switches connected into the circuit of said motor means, a plurality of ordinal switches, and a relay having contacts in series with said motor switches; and operating means for said switching means controlled by said control shaft means to be coupled in one of said rate changing positions to said fare representing means so as to be actuated by said fare indicating means operating at a speed corresponding to said first rate to operate said ordinal switches to energize said relay so that said relay contacts are operated, said motor switches being operated by said control shaft means to start said motor means in at least one preselected position of said fare indicating means whereby said control shaft means is turned by said motor means from said one rate changing position to the other rate changing position so that said fare indicating means operates from said preselected position on in accordance with the second rate associated with said other rate changing position.

14. Rate varying arrangement for a taximeter for a taxicab, comprising, in combination, fare representing means including ordinal fare indicating means; drive means for said fare representing means adapted to be driven from the wheels of the taxicab and including transmission means shiftable between a plurality of stages for driving said fare representing means at different speeds corresponding to different rates; control shaft means turnable between a plurality of control positions including two rate changing positions and connected to said trasmission means for shifting the same between said stages so that in said rate changing positions said fare representing means operate at different speeds corresponding to first and second rates; electric motor means for turning said control shaft means between said control positions; means actuated by said control shaft means for stopping said motor means and thereby said control shaft means in each of said control positions; switching means including a plurality of motor switches connected into the circuit of said motor means, a plurality of ordinal switches, and a relay having contacts in series with said motor switches; and operating means for said switching means controlled by said control shaft means to be coupled in one of said rate changing positions to said fare representing means so as to be actuated by said fare indicating means to operate said ordinal switches to energize said relay so that said relay contacts are operated, said motor switches being operated by said control shaft means to start said motor means in at least one preselected position of said fare indicating means whereby said control shaft means is turned by said motor means from said one rate changing position to the other rate changing position so that said fare indicating means operates from said preselected position on in accordance with the second rate associated with said other rate changing position, said operating means being adjustably coupled with the said fare indicating means thereby to select the preselected in said fare representing position by said fare indicating means.

15. Rate varying arrangement for a taximeter for a taxicab, comprising, in combination, fare representing means including ordinal fare indicating means; drive means for said fare representing means adapted to be driven from the wheels of the taxicab and including transmission means shiftable between a plurality of stages for driving said fare representing means at different speeds corresponding to different rates; control shaft means turnable between a plurality of control positions including two rate changing positions and connected to said transmission means for shifting the same between said stages so that in said rate changing positions said fare representing means operate at different speeds corresponding to first and second rates; electric motor means for turning said control shaft means between said control positions; means actuated by said control shaft for stopping said motor means and thereby said control shaft means in each of said control positions; switching means connected into the circuit of said motor means; and operating means for said switching means controlled by said control shaft means to be coupled in one of said rate changing positions to said fare representing means so as to be actuated by said fare indicating means operating at a speed corresponding to said first rate to operate said switching means to start said motor means in at least one preselected position of said fare indicating means whereby said control shaft means is turned by said electric moving means automatically from said one rate changing position to the other rate changing position so that said fare indicating means operates from said preselected position on in accordance with the second rate associated with said other rate changing position, said operating means being adjustably coupled with the said fare indicating means thereby to select the preselected in said fare representing position by said fare indicating means.

References Cited by the Examiner

UNITED STATES PATENTS

| 2,428,080 | 9/1947 | Horn | 235—30 |
| 2,596,164 | 5/1952 | Palmer | 235—30 |
| 2,904,251 | 9/1959 | Hazard et al. | |
| 2,998,188 | 8/1961 | Mast et al. | |
| 3,078,037 | 2/1963 | Finzi | 235—132 |

FOREIGN PATENTS 772,798   4/1957   Great Britain.

LOUIS J. CAPOZI, *Primary Examiner.*

LEO SMILOW, *Examiner.*